(12) United States Patent
Burr

(10) Patent No.: US 11,903,511 B1
(45) Date of Patent: Feb. 20, 2024

(54) CURTAIN ROD SUPPORT ASSEMBLY

(71) Applicant: BURR DISTRIBUTION, LLC, North Attleboro, MA (US)

(72) Inventor: Derrek Burr, Attleboro, MA (US)

(73) Assignee: BURR DISTRIBUTION, LLC, North Attleboro, MA (US)

( * ) Notice: Subject to any disclaimer, the term of this patent is extended or adjusted under 35 U.S.C. 154(b) by 0 days.

(21) Appl. No.: 17/406,044

(22) Filed: Aug. 18, 2021

Related U.S. Application Data

(60) Continuation-in-part of application No. 29/803,586, filed on Aug. 13, 2021, now Pat. No. Des. 965,419,
(Continued)

(51) Int. Cl.
*A47H 1/142* (2006.01)
*A47H 1/102* (2006.01)
(Continued)

(52) U.S. Cl.
CPC ............. *A47H 1/142* (2013.01); *A47H 1/102* (2013.01); *A47H 1/122* (2013.01); *F16B 13/04* (2013.01)

(58) Field of Classification Search
CPC .......... A47H 1/142; A47H 1/14; A47H 1/102; A47H 1/122; A47G 1/20; F16B 45/00; F16B 13/04
(Continued)

(56) References Cited

U.S. PATENT DOCUMENTS

| 726,950 A | 5/1903 | Larson |
| 762,594 A * | 6/1904 | Michaels ............... F16B 15/04 248/254 |

(Continued)

FOREIGN PATENT DOCUMENTS

| CH | 158195 A | 11/1932 |
| CH | 160396 A | 3/1933 |

(Continued)

OTHER PUBLICATIONS

Sterling, Amy, Non-Final Office Action for U.S. Appl. No. 15/990,779, dated May 10, 2019, 14 pgs., United States Patent and Trademark Office, Alexandria, VA, USA.
(Continued)

*Primary Examiner* — Taylor Morris
(74) *Attorney, Agent, or Firm* — John J. Brooks, III; John Brooks Law LLC

(57) ABSTRACT

A support assembly is provided comprising a support portion, an anchoring portion and a receptacle portion configured to receive and secure an item to a wall. In some embodiments, the support assembly comprises a support portion having an upper end and a lower end, an anchoring portion having a penetration end and support end, a receptacle portion having a support end and a receptacle end, the penetration end of the anchoring portion comprising a sharpened tine whereby the anchoring portion may be forced into the wall without the need to drill a hole, and the receptacle end of the receptacle portion having a u-shape whereby the receptacle portion is configured to receive and retain a curtain rod. In some embodiments, anchoring portion comprises an arcuate member. In some embodiments, the anchoring portion comprises a straight member.

14 Claims, 12 Drawing Sheets

Related U.S. Application Data and a division of application No. 16/582,172, filed on Sep. 25, 2019, said application No. 29/803,586 is a continuation of application No. 16/582,172, filed on Sep. 25, 2019.

(60) Provisional application No. 62/736,019, filed on Sep. 25, 2018.

(51) Int. Cl.
  *A47H 1/122* (2006.01)
  *F16B 13/04* (2006.01)

(58) Field of Classification Search
  USPC ........................................................ 248/262
  See application file for complete search history.

(56) References Cited

U.S. PATENT DOCUMENTS

| | | | | |
|---|---|---|---|---|
| 769,794 | A * | 9/1904 | Fowler | A47G 1/16 248/489 |
| 795,704 | A * | 7/1905 | Jones | A47G 25/0607 248/217.1 |
| 831,194 | A | 9/1906 | Shepard | |
| 928,190 | A | 7/1909 | Flynn | |
| 940,711 | A * | 11/1909 | Eells et al. | A47H 1/142 248/262 |
| 969,051 | A * | 8/1910 | Garraway et al. | A47H 1/13 248/254 |
| 1,033,440 | A | 7/1912 | Moffat | |
| 1,060,741 | A | 5/1913 | Chamberland | |
| 1,147,355 | A | 7/1915 | Zevin et al. | |
| 1,210,610 | A * | 1/1917 | Dehn | A47G 1/16 248/909 |
| 1,291,249 | A | 1/1919 | Taylor | |
| 1,370,868 | A | 3/1921 | Wiecek | |
| 1,384,246 | A * | 7/1921 | Durnell | E06B 9/50 248/252 |
| 1,525,895 | A | 2/1925 | Sherwood | |
| 1,963,802 | A | 6/1934 | Pekter | |
| D101,104 | S | 9/1936 | Bushey et al. | |
| 2,316,053 | A * | 4/1943 | Davis | D06F 57/00 248/295.11 |
| 2,594,656 | A * | 4/1952 | Junkunc | A47H 1/122 248/265 |
| 2,606,733 | A | 8/1952 | Krajewski | |
| 2,607,412 | A | 8/1952 | Vance | |
| 2,789,783 | A * | 4/1957 | Jones | A47G 1/20 248/218.2 |
| 3,020,602 | A * | 2/1962 | Siering | E04F 13/0816 52/363 |
| 3,090,588 | A | 5/1963 | Monette | |
| 3,199,823 | A | 8/1965 | Stall | |
| 3,219,302 | A * | 11/1965 | Smith | A47G 1/20 248/905 |
| 3,298,651 | A * | 1/1967 | Passer | A47G 1/20 248/217.2 |
| 3,433,281 | A | 3/1969 | Lukashok | |
| 3,614,045 | A | 10/1971 | Cegielski, Jr. | |
| D242,986 | S | 1/1977 | Inglis | |
| D251,180 | S | 2/1979 | Mader et al. | |
| 4,140,294 | A * | 2/1979 | Zwarts | A47H 1/122 248/265 |
| 4,300,745 | A * | 11/1981 | Peterson | A47H 1/102 248/217.1 |
| 4,322,050 | A * | 3/1982 | Roach | A47H 1/122 248/265 |
| 4,325,528 | A * | 4/1982 | Martin | F16M 13/02 D8/373 |
| D265,285 | S | 7/1982 | Englert, Jr. | |
| 4,417,712 | A | 11/1983 | DeHart | |
| 4,441,433 | A * | 4/1984 | Caldwell | A47B 57/52 248/222.51 |
| 4,485,995 | A * | 12/1984 | Hogg | A47G 1/20 248/222.51 |
| 4,509,713 | A * | 4/1985 | Hogg | F16B 15/00 248/217.4 |
| 4,619,430 | A * | 10/1986 | Hogg | A47F 5/0823 248/218.1 |
| D290,224 | S | 6/1987 | Skinner | |
| D290,931 | S | 7/1987 | Powell | |
| 4,684,095 | A | 8/1987 | Athey | |
| D315,862 | S | 4/1991 | Specker, Jr. | |
| D329,372 | S | 9/1992 | Wilms | |
| 5,149,037 | A * | 9/1992 | Smith | A47F 5/0876 248/222.51 |
| 5,275,225 | A | 1/1994 | Marasco et al. | |
| 5,398,900 | A | 3/1995 | Schober | |
| D376,755 | S | 12/1996 | Cox | |
| 5,582,303 | A | 12/1996 | Sloan | |
| D389,035 | S | 1/1998 | Smiley et al. | |
| 6,371,427 | B1 * | 4/2002 | Johnson | A47G 1/20 248/303 |
| D459,978 | S | 7/2002 | Holligner | |
| D464,013 | S | 10/2002 | Adams et al. | |
| 6,641,344 | B2 * | 11/2003 | Weiss | F16B 15/00 411/499 |
| 7,540,458 | B2 * | 6/2009 | Forbes | F16B 45/00 248/217.1 |
| D605,931 | S | 12/2009 | Piersant | |
| D611,328 | S | 3/2010 | Hanley et al. | |
| D620,779 | S | 8/2010 | Kunnath et al. | |
| D658,043 | S | 4/2012 | Burr | |
| 8,356,782 | B2 * | 1/2013 | Robichaud | A47G 25/0635 248/217.1 |
| D678,754 | S | 3/2013 | Burr | |
| 8,418,975 | B1 | 4/2013 | Burr | |
| 8,500,078 | B2 * | 8/2013 | Castellanos | A47B 96/06 248/223.41 |
| D707,535 | S | 6/2014 | Burr | |
| 8,844,886 | B2 * | 9/2014 | Mejia | A47G 1/20 248/216.4 |
| D742,726 | S * | 11/2015 | Glass | E06B 9/50 D8/367 |
| 9,429,178 | B2 * | 8/2016 | Hampel | F16B 13/04 |
| 9,609,974 | B2 | 4/2017 | Mateer | |
| D811,205 | S | 2/2018 | Hanley | |
| D813,021 | S | 3/2018 | Hanley | |
| D813,022 | S | 3/2018 | Hanley | |
| 10,064,512 | B2 | 9/2018 | McMillion | |
| 10,228,080 | B2 * | 3/2019 | Zvak | F16L 3/02 |
| D847,613 | S | 5/2019 | Hanley | |
| 10,376,086 | B1 | 8/2019 | Mustafa | |
| 10,448,773 | B2 * | 10/2019 | Muñiz | A47H 1/122 |
| 10,539,266 | B2 * | 1/2020 | Will | A47G 1/202 |
| 10,542,835 | B1 | 1/2020 | Suozzo | |
| 11,092,176 | B2 | 8/2021 | Hanley | |
| 2005/0218284 | A1 * | 10/2005 | Kurrasch | F16B 15/00 248/303 |
| 2007/0235622 | A1 * | 10/2007 | Baran | F16B 45/00 248/546 |
| 2008/0290231 | A1 * | 11/2008 | Repac | A47B 96/028 248/217.4 |
| 2008/0296456 | A1 * | 12/2008 | Lien | A47G 1/20 248/304 |
| 2008/0302936 | A1 * | 12/2008 | Forbes | A47H 13/14 248/265 |
| 2010/0224749 | A1 | 9/2010 | Tran | |
| 2014/0231604 | A1 * | 8/2014 | Long | F16M 13/02 248/217.3 |

(56) References Cited

U.S. PATENT DOCUMENTS

2014/0231606 A1* 8/2014 Sobb .................. A47F 5/0823
                                                    248/224.8
2021/0345808 A1* 11/2021 Berman ................ F16B 13/04

FOREIGN PATENT DOCUMENTS

| FR | 796532 A | 4/1936 |
|----|----------|--------|
| GB | 2603258 A | 8/2022 |
| WO | 2015009565 A2 | 1/2015 |

OTHER PUBLICATIONS

Sterling, Amy, Final Office Action for U.S. Appl. No. 15/990,779, dated Aug. 30, 2019, 7 pgs., United States Patent and Trademark Office, Alexandria, VA, USA.

Sterling, Amy, Notice of Allowance for U.S. Appl. No. 15/990,779, dated Nov. 6, 2019, 8 pgs., United States Patent and Trademark Office, Alexandria, VA, USA.

Underwood, Cynthia, Notice of Allowance for U.S. Appl. No. 29/712,406, dated Jun. 29, 2020, 43 pgs., United States Patent and Trademark Office, Alexandria, VA, USA.

Blackwell II, Harold E., Notice of Allowance for U.S. Appl. No. 29/803,586, dated Apr. 28, 2022, 8 pgs, United States Patent and Trademark Office, Alexandria, VA, US.

Morris, Taylor L., Non-Final Office Action for U.S. Appl. No. 16/582,172, dated Jan. 27, 2021, 11 pgs, United States Patent and Trademark Office, Alexandria, VA, USA.

Morris, Taylor L., Final Office Action for U.S. Appl. No. 16/582,172, dated Aug. 10, 2021, 15 pgs, United States Patent and Trademark Office, Alexandria, VA, USA.

Morris, Taylor L., Advisory Action for U.S. Appl. No. 16/582,172, dated Oct. 29, 2021, 3 pgs, United States Patent and Trademark Office, Alexandria, VA, USA.

Morris, Taylor L., Non-Final Office Action for U.S. Appl. No. 16/582,172, dated Dec. 29, 2021, 21 pgs, United States Patent and Trademark Office, Alexandria, VA, USA.

Morris, Taylor L., Examiner Interview Summary for U.S. Appl. No. 16/582,172, dated Mar. 21, 2022, 4 pgs, United States Patent and Trademark Office, Alexandria, VA, USA.

Morris, Taylor, Non-Final Office Action for U.S. Appl. No. 16/582,172, dated Nov. 28, 2022, 91 pgs., United States Patent and Trademark Office, Alexandria, VA, USA.

* cited by examiner

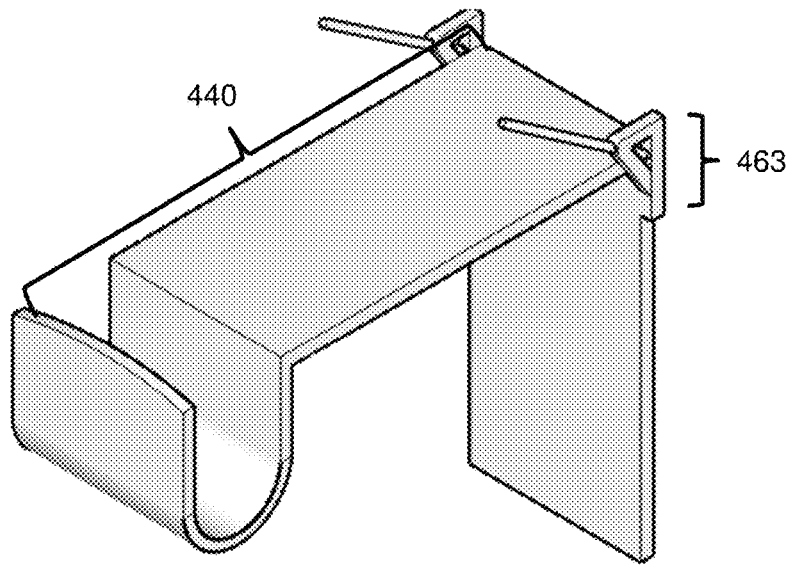
FIG. 4A
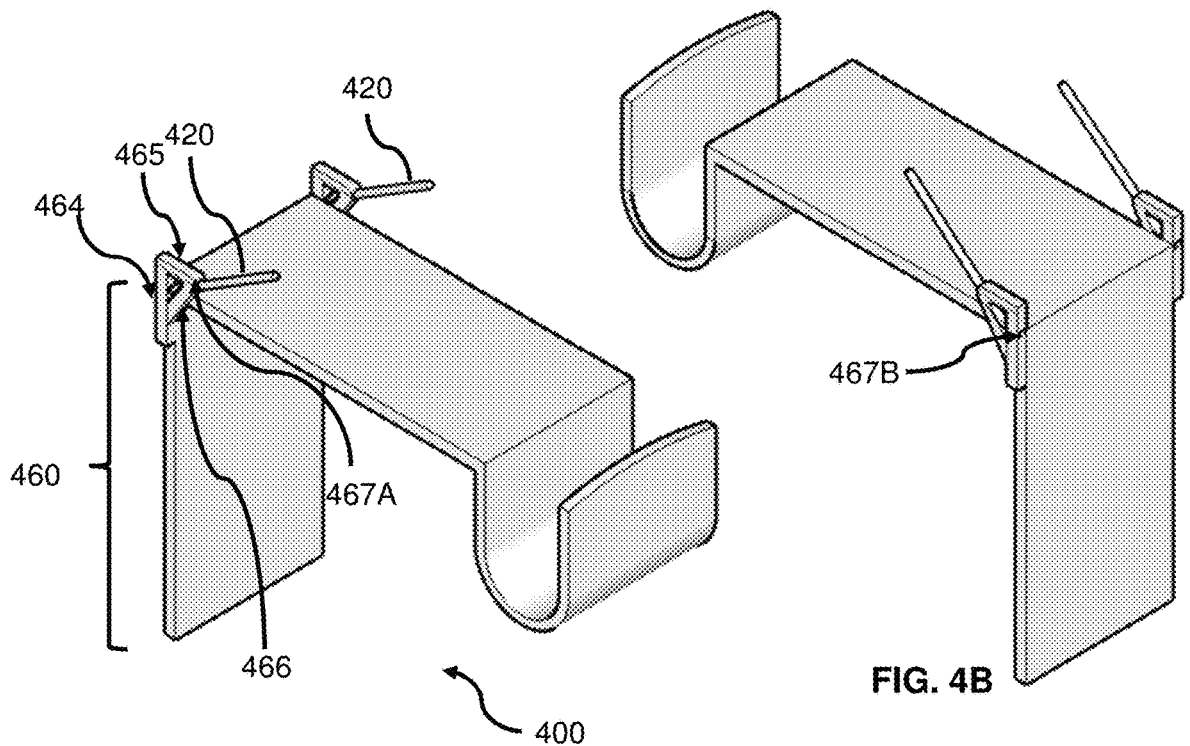
FIG. 4C
FIG. 4B

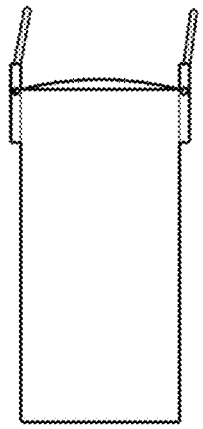 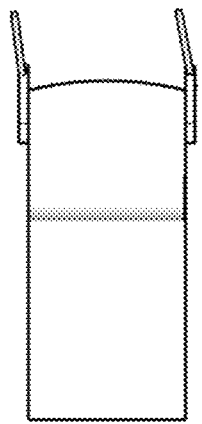
FIG. 4D  FIG. 4E
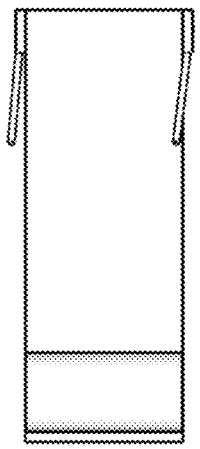 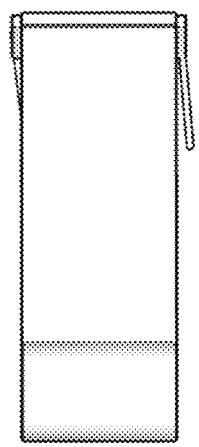
FIG. 4F  FIG. 4G
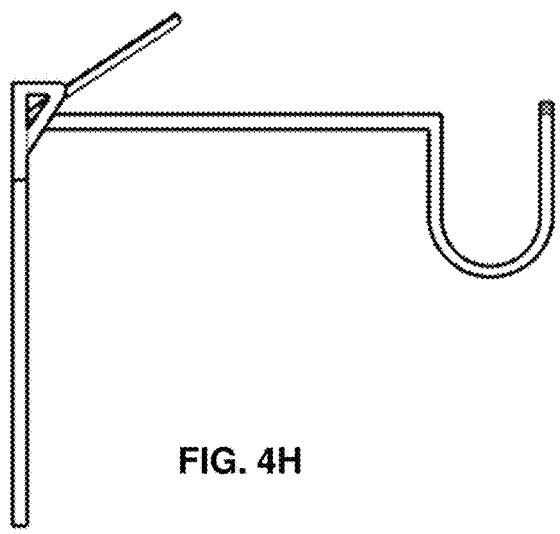
FIG. 4H
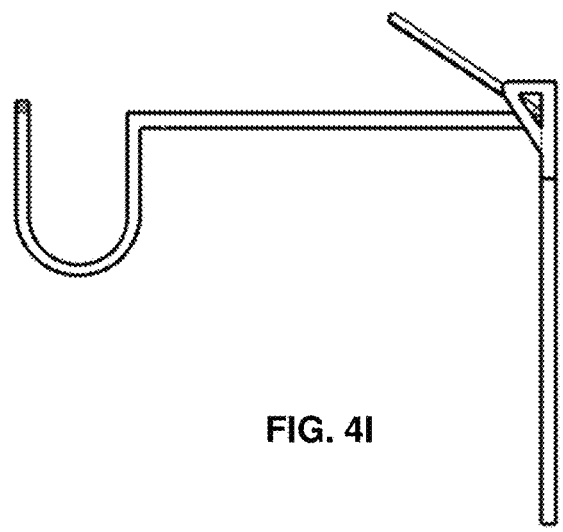
FIG. 4I

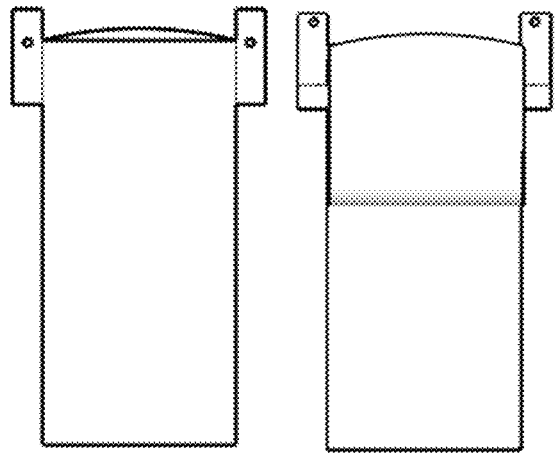
FIG. 5C  FIG. 5D
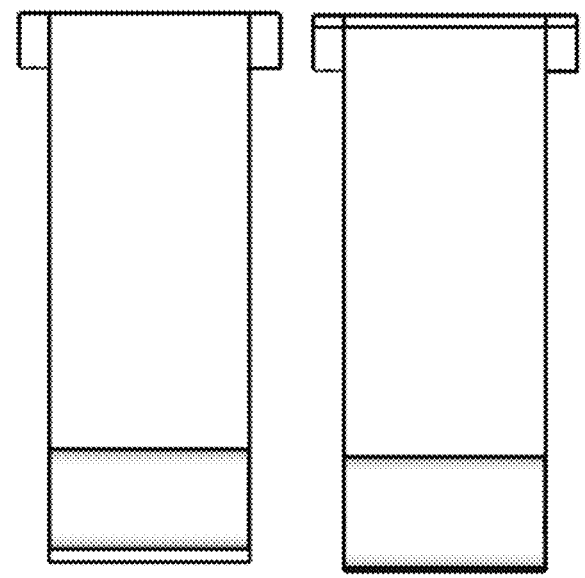
FIG. 5E  FIG. 5F
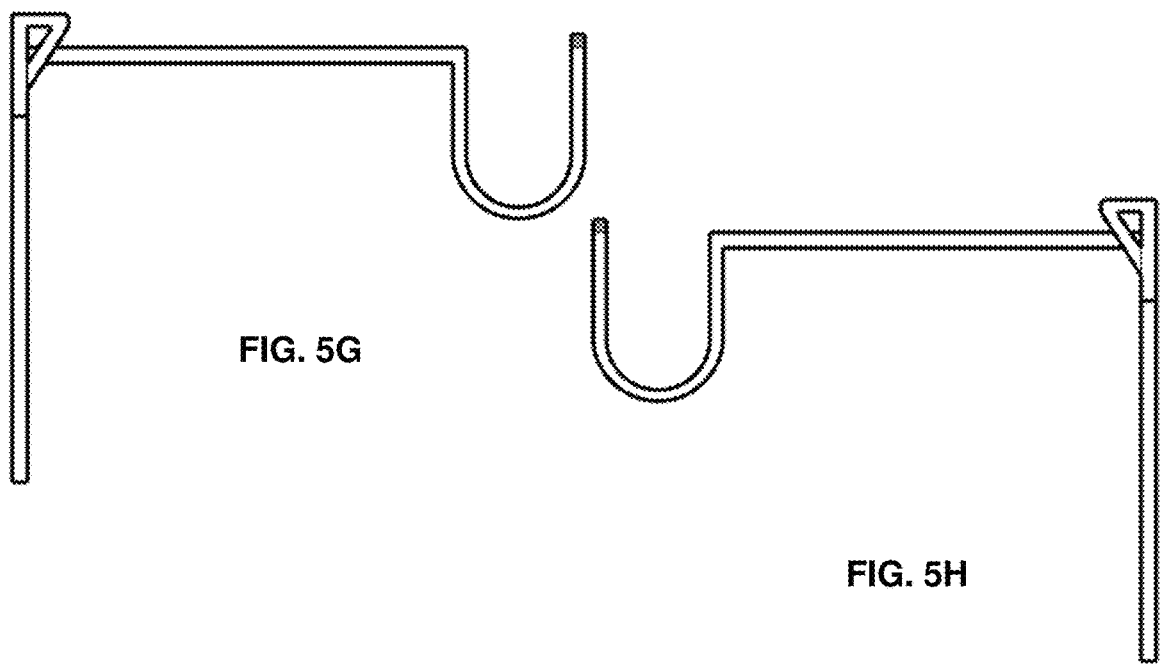
FIG. 5G
FIG. 5H

CURTAIN ROD SUPPORT ASSEMBLY

CROSS-REFERENCE TO RELATED APPLICATIONS:

This application is a Division application of pending U.S. patent application Ser. No. 16/582,172, filed on Sep. 25, 2019, entitled "CURTAIN ROD SUPPORT ASSEMBLY"; this application is also a Continuation-in-Part application of pending U.S. patent application Ser. No. 29/803,586, filed on Aug. 13, 2021, entitled "CURTAIN ROD SUPPORT ASSEMBLY"; U.S. patent application Ser. No. 29/803,586 is a Continuation application of pending U.S. patent application Ser. No. 16/582,172; U.S. patent application Ser. No. 16/582,172 claims the benefit of U.S. patent application Ser. No. 62/736,019, filed on Sep. 25, 2018, entitled "CURTAIN ROD SUPPORT ASSEMBLY"; and the entire contents of all are herein incorporated by reference.

STATEMENT REGARDING FEDERALLY SPONSORED RESEARCH OR DEVELOPMENT

Not Applicable.

NAMES OF PARTIES TO A JOINT RESEARCH AGREEMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

1. Field of the Invention

This invention relates to attachment of support assemblies to a surface. More particularly, it relates to methods and devices for such attachment to walls with the minimal use of additional tools.

2. Background of the Invention

Today, many walls are made from wallboard. Wallboard, also known as drywall, sheetrock, plasterboard, gib board, rock lath, and gypsum board became popular for residential and commercial construction. Wallboard is generally comprised of a pair of sheathings or liners on both sides of a gypsum or gypsum-like core. The liner material can be paper, polymers, or other sheet materials. Gypsum wallboard, in the United States, is available in varying thicknesses with the common thicknesses ranging from 0.50 to 0.625 inches with 0.50 inches being the most commonly used. Other types of wallboard may include wallboard alternatives such as a combination of foam insulation and mineral board (Wahoo Walls), wall panels, wall paneling or wall finishing systems such as Owens-Corning Basement Finishing System.

For such wallboard, it is known that when anchoring objects, force distribution between the anchor and the wallboard is critical as gypsum core will crush easily under concentrated localized shear forces. Conventional attachment means, such as a nail, are not effective in drywall except for holding very modest weights due to the concentration of forces on the wall. Weight from an object suspended on the nail tends to crush the gypsum and rip the paper immediately below the nail. Any such displacement by the nail loosens and weakens the attachment. The moment caused by the weight generally provides a dislodging force on the nail that is increased as the nail is loosened. Such nails that are solely in gypsum wallboard are clearly not usable for attaching support devices such as shelves, bathroom accessories, or any object that will be manipulated on the wall.

More substantial attachment to conventional wallboard is accomplished by connectors that utilize clamping members that pierce the wallboard and provide a clamping action, typically by way of a screw, between the inner and outer surfaces of the wallboard. Such hangers provide very secure attachment but are relatively complicated with usually two or more moving parts and can be tedious to install. Also, where there is a stud or no cavity behind the wallboard, such connectors won't work. These connectors cause significant damage to the wall when removed and may be very difficult to remove. Other wallboard connectors utilize an expanding cylinder or conical insert that provides significantly more surface area contact with the wallboard. These also utilize a plurality of components and take several distinct operations to install. If removed, there is significant damage to the wallboard.

Additionally, supporting elements like curtain rods on a wall present the challenge created by the force moments resulting from the length the curtain rods are positioned from the wall. These challenges are increased by the weakness of wall materials, such as wallboard, to withstand a pulling of the mounting mechanisms from the wall.

Other materials such as plaster, plasterboard, sheet rock, strawboard and the soft woods can be used to construct walls.

Thus, there is a need for a simple, user-friendly, and secure assembly for mounting decorative items such as curtains, canopies, drapes, and the like onto wall surfaces such as drywall.

BRIEF SUMMARY OF THE INVENTION

The following summary is included only to introduce some concepts discussed in the Detailed Description below. This summary is not comprehensive and is not intended to delineate the scope of protectable subject matter, which is set forth by the claims presented at the end.

In general, the support assembly is intended to be fixed to a wall surface without requiring a lot of additional tools, such as drills to drill holes in the wall. In some embodiments, the support assembly may be fixed to the wall surface without the use of separate securing mechanisms such as nails or screws. The support assembly is especially suitable for mounting on walls made of penetrable compositions such as wallboard, plaster, plasterboard, sheet rock, strawboard and the soft woods because the assembly is constructed to have slender pointed elements, such as tines, inserted into and embedded in the walls. In some embodiments, the support assembly penetrates all the way through the wall material.

In some embodiments, the support assembly is formed, as by stamping, from a single strip of sheet metal, e.g. soft steel, from which a pair of slender pointed tines protrude rearwardly and horizontally and from which the receptacle portion (e.g., hook) projects forwardly and upwardly. Each tine is free of the support portion except at its base where it is integral with the support portion. Further, the tines may be mirror-images of one another.

In one example embodiments, a support assembly for supporting an object on a wall is provided comprising a support portion having an upper end and a lower end, an anchoring portion having a penetration end and support end, a receptacle portion having a support end and a receptacle end, the support end of the anchoring portion and the support end of the receptacle portion both rigidly coupled to the upper end of the support portion, the support end of the anchoring portion rigidly coupled to one of the upper end of the support portion or the support end of the receptacle portion. the anchoring portion comprising an arcuate member, the penetration end of the arcuate member comprising a sharpened tine whereby the anchoring portion may be forced into the wall without the need to drill a hole, and the receptacle end of the receptacle portion having a u-shape whereby the receptacle portion is configured to receive and retain a curtain rod as the object. In some embodiments, the arcuate member has a radius of curvature in the range of about 0.25 inches to 0.75 inches. In some embodiments, the arcuate member comprises a first arcuate portion and a second arcuate portion, the first arcuate portion has a radius of curvature in the range of about 0.25 inches to 0.75 inches, and the second arcuate portion has a radius of curvature larger than the radius of curvature of the first arcuate portion. In some embodiments, the penetration end of the arcuate member engages a rear surface of the wall when the support assembly is installed whereby the penetration end provides an offsetting moment to a support moment caused by the curtain rod retained in the receptacle end of the receptacle portion. In some embodiments, the support portion is a generally planar element and the receptacle portion is a generally planar element having a curved receptacle end. In some embodiments, the support portion further comprises a one or more holes, the anchoring portion comprises one or more tine separable from the support portion and the anchoring portion, and the one or more holes configured to couple the one or more tine to the support portion. In some embodiments, the support assembly is an integral assembly.

In another example embodiment, a support assembly for supporting an object on a wall is provided comprising a support portion having an upper end and a lower end, an anchoring portion having a penetration end and support end, a receptacle portion having a support end and a receptacle end, the support end of the anchoring portion and the support end of the receptacle portion both rigidly coupled to the upper end of the support portion, the support end of the anchoring portion rigidly coupled to one of the upper end of the support portion or the support end of the receptacle portion, the penetration end of the anchoring portion comprising a sharpened tine whereby the anchoring portion may be forced into the wall without the need to drill a hole, and the receptacle end of the receptacle portion having a u-shape whereby the receptacle portion is configured to receive and retain a curtain rod as the object. In some embodiments, the anchoring portion comprising an arcuate member. In some embodiments, the anchoring portion comprising a straight member. In some embodiments, the anchoring portion is a separable element from the support portion and the receptacle portion. In some embodiments, the support portion further comprises a bracket portion configured to receive the anchoring portion. It thus will be seen that a support assembly is provided which is well adapted to meet the conditions of practical use.

As various possible embodiments might be made of the above invention, and as various changes might be made, in the embodiment set forth, it is to be understood that all matter herein described or shown in the accompanying drawings is to be interpreted as illustrative and not in a limiting sense.

BRIEF DESCRIPTION OF THE SEVERAL VIEWS OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only example embodiments of the invention and are not therefore to be considered to be limiting of its scope, the invention will be described and explained with additional specificity and detail through the use of the accompanying drawings in which:

FIG. 1A illustrates a side view and FIG. 1B illustrates a top perspective view;

FIG. 1C is a front elevational view of the curtain rod support assembly showing the new design, FIG. 1D is a rear elevational view thereof, FIG. 1E is a rear view thereof, FIG. 1F is a front view thereof, FIG. 1G is a top view thereof, FIG. 1H is a bottom view thereof, FIG. 1I is a left side view thereof and FIG. 1J is a right side view thereof;

FIG. 2A illustrates a side view of the assembly mounted in a wall, FIG. 2B illustrates a top perspective view of the assembly, and FIG. 2C illustrates a front view of the support assembly mounted on a wall;

FIG. 2D is a front elevational view of the curtain rod support assembly showing the new design, FIG. 2E is a rear view thereof, FIG. 2F is a front view thereof, FIG. 2G is a top view thereof, FIG. 2H is a bottom view thereof, FIG. 2I is a left side view thereof and FIG. 2J is a right side view thereof;

FIGS. 4A-4I illustrate the ornamental design for a curtain rod support assembly: FIG. 4A is a front elevational view of the curtain rod support assembly showing the new design, FIG. 4B is a rear elevations view thereof, FIG. 4C is a side elevational view thereof, FIG. 4D is a rear view thereof, FIG. 4E is a front view thereof, FIG. 4F is a top view thereof, FIG. 4G is a bottom view thereof, FIG. 4H is a left side view thereof and FIG. 4I is a right side view thereof; and FIGS. 5A-5H illustrate the ornamental design for a curtain rod support assembly: FIG. 5A is a side elevational view of the curtain rod support assembly showing the new design, FIG. 5B is a side elevational view thereof, FIG. 5C is a rear view thereof, FIG. 5D is a front view thereof, FIG. 5E is a top view thereof, FIG. 5F is a bottom view thereof, FIG. 5G is a left side view thereof and FIG. 5H is a right side view thereof.

Figure 1A:
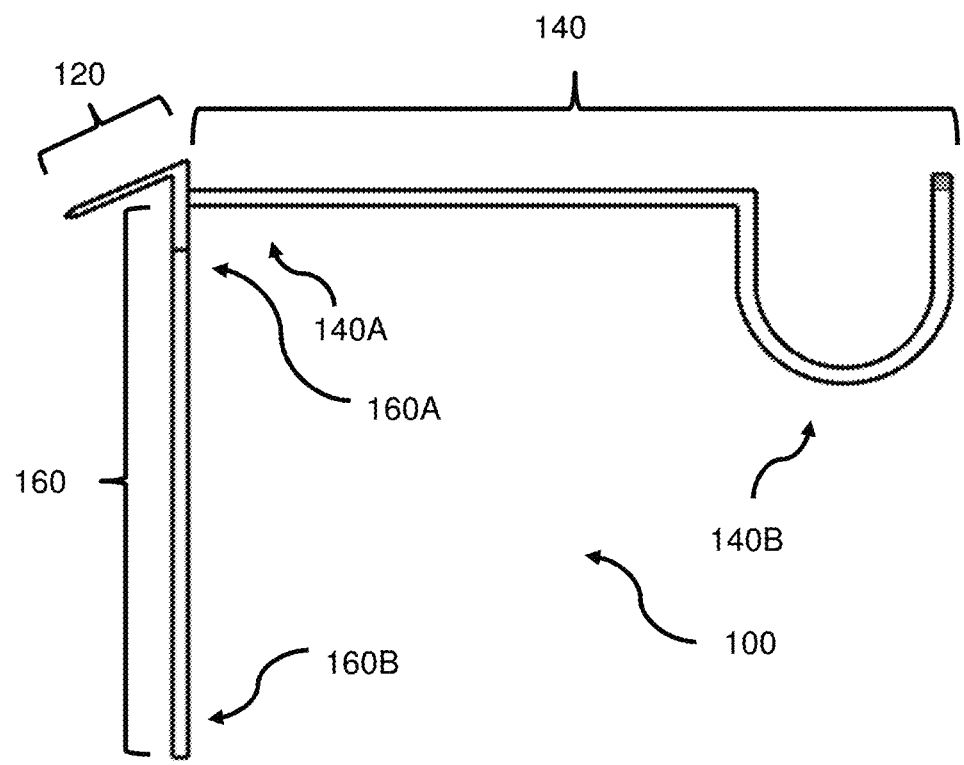
FIGS. 1A-1B show an example embodiment of a support assembly.

The following detailed description is of the best currently contemplated modes of carrying out exemplary embodiments of the invention. The description is not to be taken in a limiting sense but is made merely for the purpose of illustrating the general principles of the invention, since the scope of the invention is defined by the appended claims.

DETAILED DESCRIPTION OF THE INVENTION

This invention is a new article of manufacture adapted to be used as a retainer or hanging device in the various arts. For example, it may be used in the hanging of curtain rods or other articles on walls. Broadly, embodiments of the present invention generally encompass a support assembly utilizing an anchoring portion, a support portion and a receptacle portion structure that provides a way to easily hang or retain items on a wall.

In general, the support assembly is intended to be fixed with unusual firmness to a wall surface with minimal if any use of tools such as hammers, drills or screwdrivers. In some embodiments, the support assembly may be used without other separate securing means such as nails or screws. In some embodiments, the anchoring portion of the support assembly is constructed to have slender elements, such as pointed tines, that can be easily inserted into and embedded in the walls and can be easily removed without significant damage to the wall.

In general, embodiments of the support assembly comprise an anchoring portion, a support portion and a receptacle portion. The support assembly is especially suitable for mounting on walls made of penetrable compositions such as plaster, plasterboard, sheet rock, strawboard and the softwoods. The support assembly may be used as a separate assembly to secure items to a surface or the features may be integrated into other items to secure those items to a surface. Items that may be secured with the support assembly may include items such as household or office items, not limited to shelving, picture frames, posters, racks, tooth brushes, toilet paper, decorative items, window treatments, cabinets and operative devices, such as clocks, speakers, and other electrical items.

The support portion generally provides a support for the support assembly against the wall surface. For example, the support portion provides a resistance force to a load that is place on other portions of the support assembly such as the receptacle portion. The resistance force is provided by the support portion resting on a generally immovable surface. The support portion is configured and shaped such that it will provide the resistance force without damaging the generally immovable surface. In one example embodiment where the support assembly functions as a curtain rod support assembly, the support portion rests against a wall surface and the support portion provides the resistance force to support a curtain rod held by the receptacle portion. The shaping of the support portion is generally planar having a flat rear surface that rests against the surface of the wall and spreads the force from the support assembly sufficiently across the wall surface.

Figure 1B:
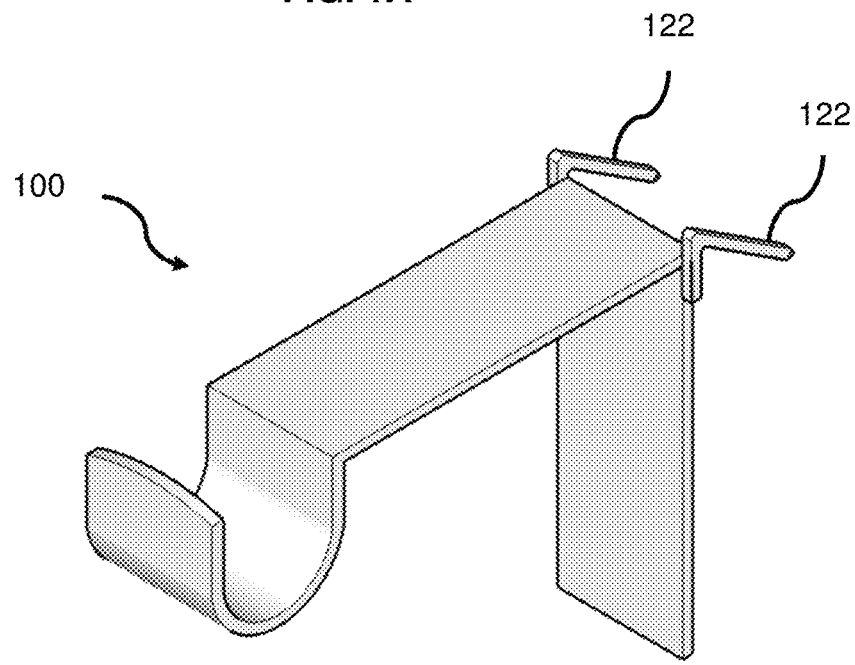

The receptacle portion generally receives, holds and couples other devices to the support assembly. The receptacle portion is configured and shaped such that it will removably receive and secure the other device to the support assembly. The receptacle portion may be configured to have a shape such as a hook or a support to receive and secure separate elements such as curtain rods or hooks/wires on the back of wall hangings. In an example embodiment where the support assembly is used as a curtain rod support assembly, the receptacle portion is shaped to mate with the outside shape of the curtain rod so that the rod can be received and secured to the receptacle portion. As shown in FIGS. 1A-1B, the shaping may be round or curved to receive a round curtain rod.

The anchoring portion generally provides the anchoring elements that anchor the support assembly to another surface. Generally, the anchoring portion comprises one or more sharpened protrusions that are pushed into the other surface so that the support assembly is secured to that surface. The anchoring portion may be integral with the other portions of the assembly or the anchoring portion may be a separate element that is coupled with the support assembly to anchor the assembly to the other surface.

In embodiments, the anchoring portions may be any desired shape that provides the anchoring of the support assembly to the surface. In some embodiments, the anchoring portion comprises one or more sharpened tines that extend from the support assembly. The configuration of the tines may be at any angle or curve as desired for that embodiment. As described below, the tines may be bent to be positioned at a right angle to the wall, at other angles or bent to be arcuate or curved up or down in relation to the wall. In some embodiments, the anchoring portions are tines formed as a generally flat tine, for example with a generally trapezoidal cross-sectional profile. In some embodiments, the anchoring portions are formed as generally rounded tines like a wire or nail.

In some embodiments, the anchoring portion may include a compound curvature for each of the tines which enables them to hold very firmly in any wall into which they are pushed. The compound curvature effects a greater resistance to withdrawal of the support assembly from a wall than do other hangers having nails or having tines which may be either straight or curved in only one plane. The curving of each of the tines of the anchor portion in two planes may comprise a curvature both in a vertical plane and in a horizontal plane. In the vertical plane, each of the tines is curved so that its end portion arches upwardly or downwardly and in the horizontal plane each of the tines is configured so that its end portion arches outwardly or inwardly, each of the tines curving in said horizontal plane away from or towards the other tine. In other words, each of the tines is curved as viewed in top plan and curved as viewed in said elevation. With this special configuration, when the support assembly is pushed into a wall the tines, as they enter the wall, due to their compound curvature, curve in multiple directions. That is, each of the tines curls within the interior of the wall, this curling greatly impeding any attempted subsequent removal of the hanger from the wall. In operation, the tines are forced to enter the wall until the support portion abuts the wall. Then, items such as pictures, window treatments and the like may be hung from the receptacle portion which is integrally formed from the support assembly.

In some embodiments, the anchoring portions are a separate element such as a nail or securing devices such as a "monkey hook".

In some embodiments, the support assembly is manufactured from a blank of sheet metal from which the support assembly may be efficiently formed with little or no waste material. The support assembly may be primarily formed, as by stamping, from a blank of sheet metal, e.g. soft steel, and constitutes generally a flat blank from which the support portion and the receptacle portion can be formed by cutting and/or bending portions of the blank.

In some embodiments, the support assembly is manufactured by rigidly coupling the portions together using techniques such as welding or gluing with adhesives.

In some embodiments, the support assembly is manufactured with plastics, resins, epoxies or other suitable materials. These embodiments may be molded as an integral assembly or they may be manufactured by rigidly coupling the portions together using techniques such as gluing with adhesives.

In some embodiments, the anchoring portions may also be formed from a portion of the blank. For example, the anchoring portions may be formed as one or more slender pointed tines protruding rearwardly and horizontally and the support portion projects downwardly and the receptacle portion projects forwardly. In this embodiment, the tine is free of the plate except at its base where it is integral with the plate. In embodiments with two tines, the tines may be mirror-images of one another. It will be appreciated that the shearing off of the length of the tines and the rearward orientation of the tines gives the support portion a t-shaped head configuration. Moreover, the joint of the base of each tine and the support portion may constitute a shoulder which has a large interior area integral with the support portion to assure that the support portion will not break from the plate.

The dimensions of portions of the support assembly may have any dimension suitable for stably supporting an article from the receptacle portion. For example only and not for limitation, in some embodiments of the support assembly, when used as a curtain rod support assembly, the length of the receptacle portion may range from about 1 inch to 12 inches, the length of the supporting portion may range from about 1 inch to 12 inches, the length of the anchoring portion may range from about 1 to 12 inches and an angle of curvature of the anchoring portion having a radius ranging from about 0.20 inches to 3 inches. In a preferred embodiment of a curtain rod support assembly, the length of the receptacle portion may range from about 2 to 5 inches, the length of the supporting portion may range from about 2 to 5 inches, the length of the anchoring portion may range from about 1 to 5 inches, and the curvature of the anchoring portion having a radius ranging from about 0.25 to 1.50 inches. In one preferred embodiment of a curtain rod support assembly, the angle of curvature of the anchoring portion having a radius of about 0.50 inches. The width of portions such as the support portion are sized to stabilize the support assembly on the wall surface. Depending the material from which the support assembly is made, the thickness of its portions are sized to provide sufficient rigidity to the support assembly.

The accompanying drawings illustrate different practical embodiments of the invention, but the constructions therein shown are to be understood as illustrative, only, and not as defining the limits of the invention.

Anchoring Portion Generally Perpendicular to or Angled Downward from the Mounting Surface In some example embodiments, as shown in FIGS. 1A and 1B, the support assembly 100 has an anchoring portion 120 that comprises tines configured to be inserted into the wall at a generally perpendicular angle to the wall surface. Suitable anchoring portions and anchoring means include those disclosed in U.S. Pat. No. 1,651,392, issued Dec. 6, 1927 which is herein incorporated by reference in its entirety.

Referring first to FIGS. 1A and 1B, the support assembly 100 comprises an anchoring portion 120, a support portion 160 and a receptacle portion 140. In this embodiment, the anchoring portion 120 comprises one or more tines 122 extending from the support assembly 100 and configured to be inserted into the wall generally perpendicular to the surface of the wall. The tines 122 may be cut out from the sides of the support portion 160 and/or the receptacle portion 140 with the tines converging to a sharp point which facilitates the driving of the tines into the wall surface. In some embodiments, the tines 122 may be made relatively large as compared with the width of the blank and thus possesses maximum strength to support shearing strains imposed by loads to which the support assembly may be subjected. The support portion 160 of the support assembly 100 is generally shaped in the form of a flat plate, which, during the driving of the tines 122, serves as a head for the tines. The receptacle portion 140 has a support end 140A and a receptacle end 140B. For the embodiment shown, such as to support a curtain rod, the receptacle portion 140 is generally bent or otherwise coupled at a right angle to the support portion 160 with a shaped receptacle end 140B to receive and retain a curtain rod.

In a preferred embodiment the anchoring portion 120 comprises tines configured to extend through the wall and into the hollow wall cavity. The length of the tines may be any suitable length to extend through the wall. In a preferred embodiment, the length of the tines may be about 0.50 to 1.0 inches long and in one preferred embodiment, the length is at least inches long.

It is understood that the support assembly 100 and the receptacle end 140B may have other shapes to support other items.

Figure 1C:
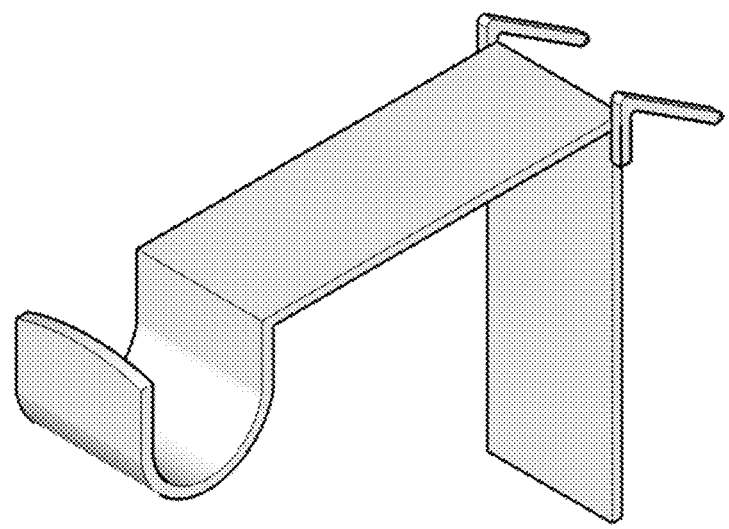
FIGS. 1C-1J illustrate the ornamental design for a curtain rod support assembly.
Figure 1D:
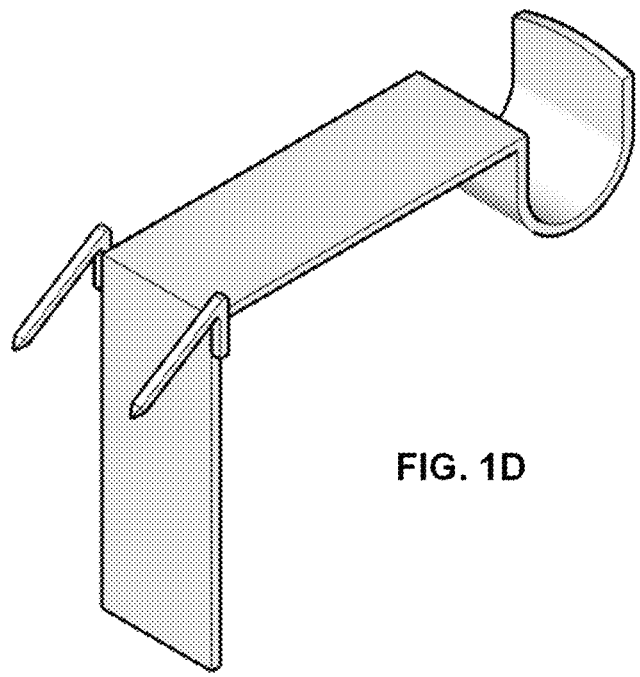
Figure 1E:
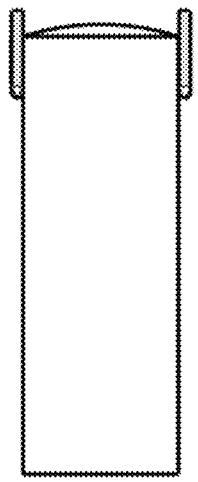
Figure 1F:
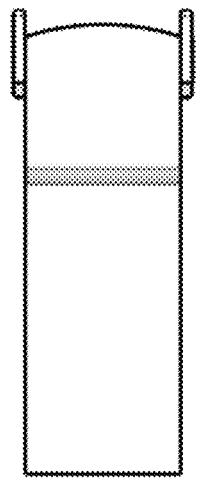
Figure 1G:
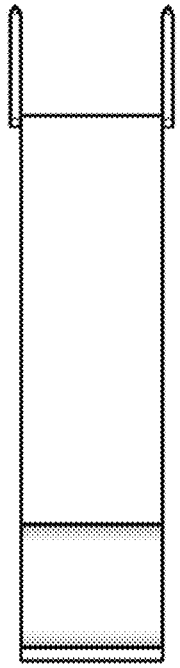
Figure 1H:
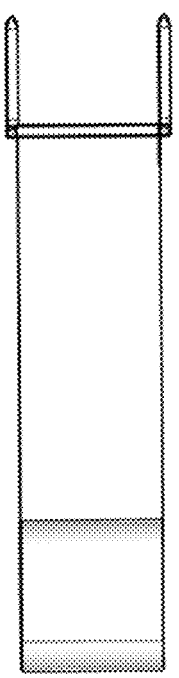
Figure 1I:
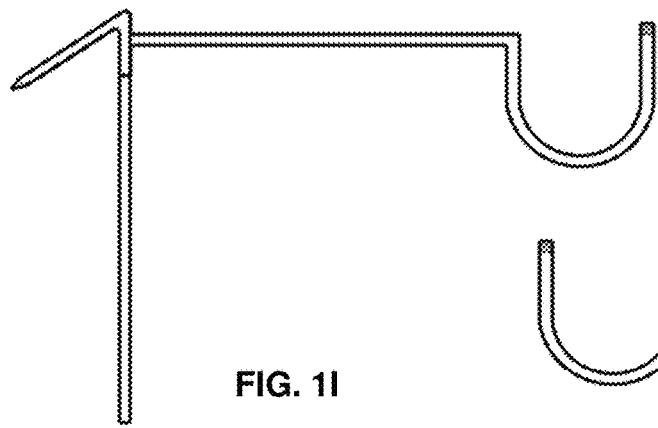
Figure 1J:
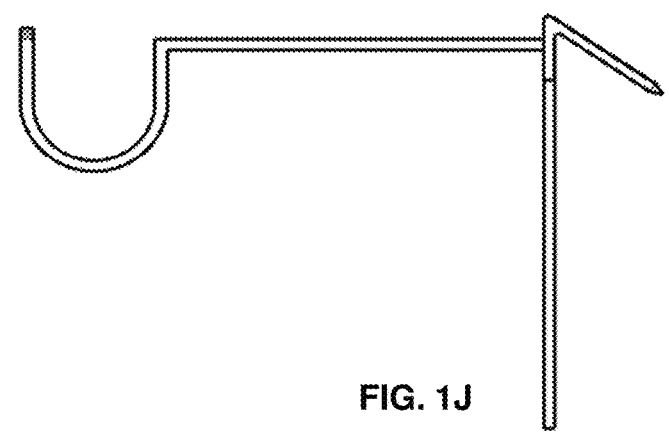

FIGS. 1C-1J illustrate the ornamental design of an example embodiment of a curtain rod support assembly: FIG. 1C is a front elevational view of the curtain rod support assembly showing the new design, FIG. 1D is a rear elevational view thereof, FIG. 1E is a rear view thereof, FIG. 1F is a front view thereof, FIG. 1G is a top view thereof, FIG. 1H is a bottom view thereof, FIG. 1I is a left side view thereof and FIG. 1J is a right side view thereof.

Arcuate Anchoring Portion Anchored Within the Wallboard

In some example embodiments, the anchoring portion comprises generally arcuate tines extending from the support portion of the support assembly. In these embodiments, the tines are configured to be inserted into the wall starting at a generally perpendicular angle to the wall surface and the curve of the tines causing the tines to project through the wallboard and downward or upward as they are inserted into the wallboard. In these embodiments, the tines may curve upwards or downwards and the radius of curvature may be about equal to or less than the thickness of the wallboard to which the support assembly is attached. With these embodiments, and slightly different than FIG. 2A, it is not necessary for the tines to pierce through both side surfaces of the wallboard surface in order for the tines to function effectively. In some embodiments, the anchoring portion may function properly even when there is no void, cavity, or hollow behind the wallboard. Suitable anchoring portions include those disclosed in U.S. Pat. No. 3,298,651, issued Jan. 17, 1967 and U.S. Pat. Pub. No. 20070235622A1 published Oct. 11, 2007 for U.S. patent application Ser. No. 11/706,839 filed on Feb. 14, 2007, both of which are herein incorporated by reference in their entirety.

Figure 2A:
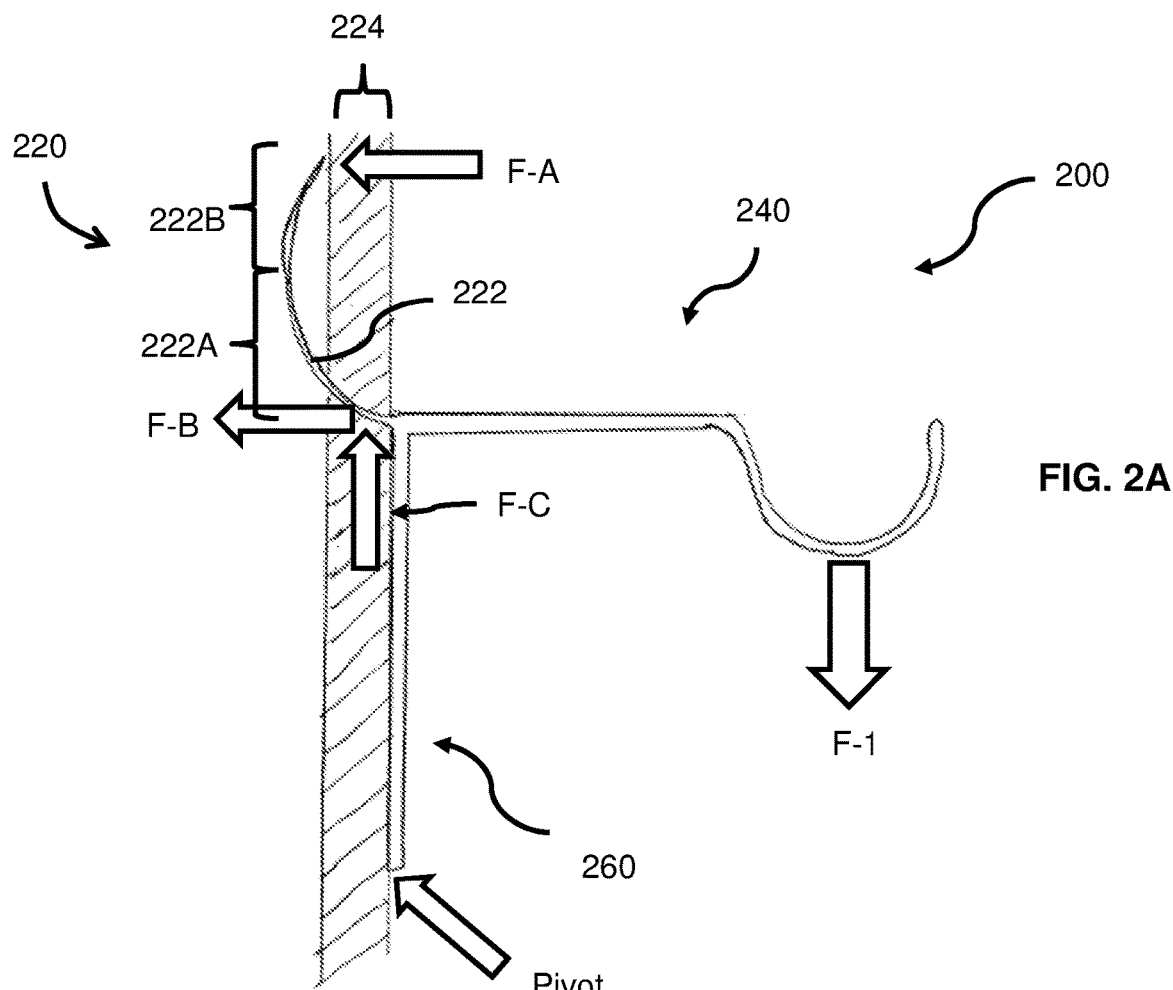
FIGS. 2A-2C show another example embodiment of a curtain rod support assembly.
Figure 2B:
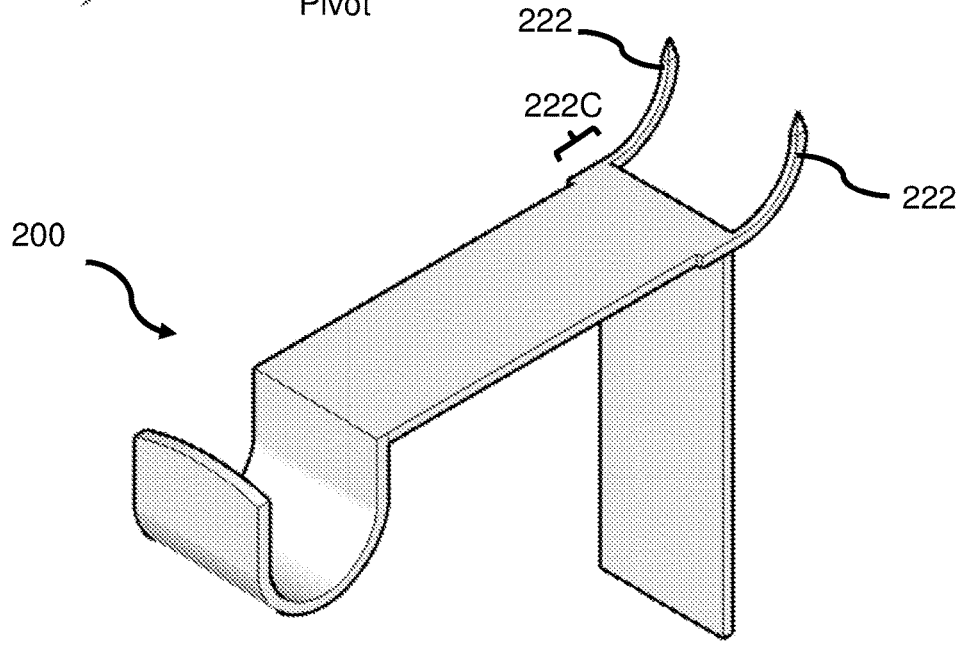
Figure 2C:
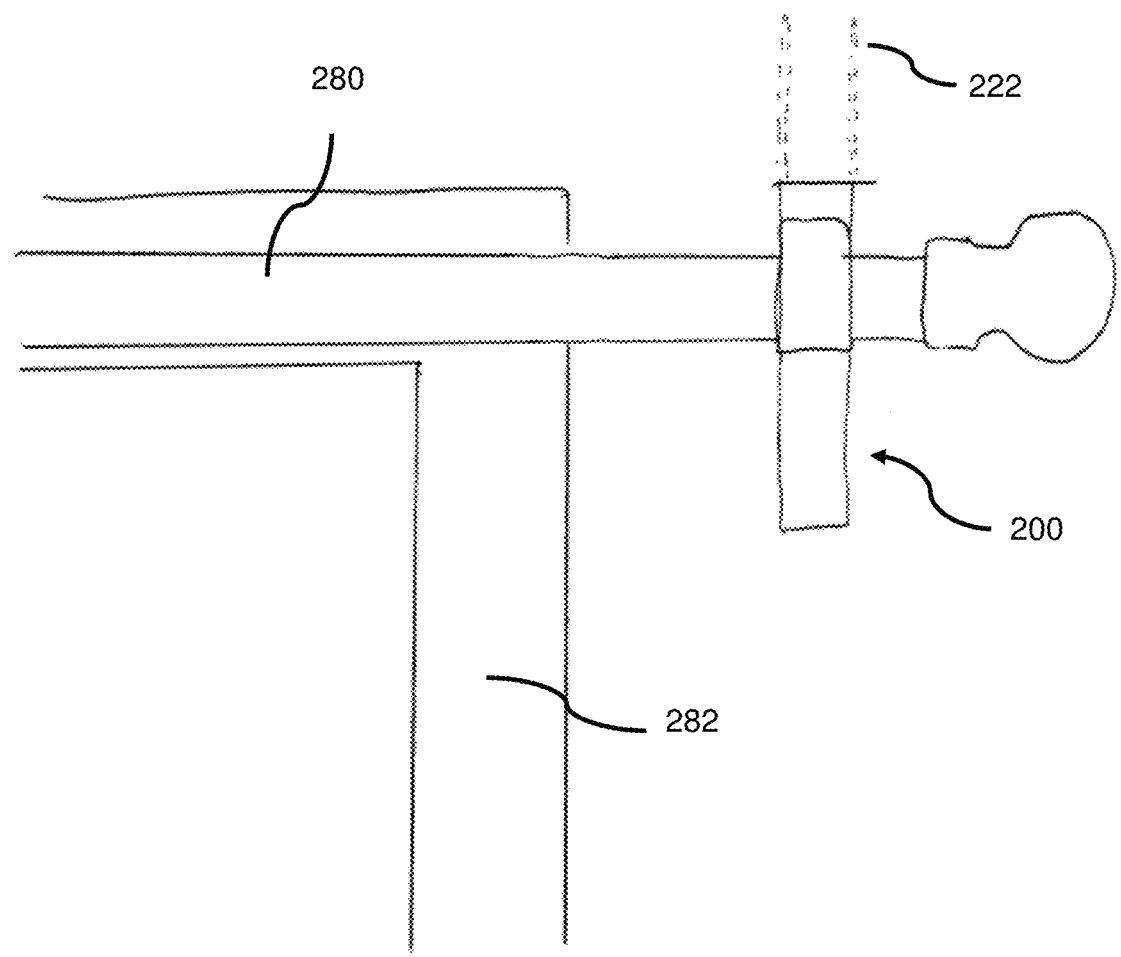

Referring first to the example embodiment in FIGS. 2B-2C, the support assembly 200 comprises an anchoring portion 220, a support portion 260 and a receptacle portion 240. In this embodiment, the anchoring portion 220 comprises one or more tine 222 having a base portion 222C integral to and extending from the edges of the receptable portion of the support assembly 200 and configured to be inserted into the wall generally perpendicular to the surface of the wall and continue into the wall by rotating the support assembly 200 downward and towards the wall. In these embodiments, the radius of curvature of the tine 222 may be any suitable dimension, but in a preferred embodiment it is slightly less than the thickness of the wall.

In some embodiments, the tines 222 may have multiple curvatures (see portions 222A and 222B in FIG. 2A). In these embodiments, the anchoring portion 220 may include a compound curvature for each of the tines which enables them to hold very firmly in any wall into which they are pushed. The compound curvature effects a greater resistance to withdrawal of the support assembly 200 from a wall than do other hangers having nails or having tines which may be either straight or curved in only one plane. The curving of each of the tines 222 of the anchor portion 220 in two planes may comprise a curvature both in a vertical plane and in a horizontal plane. With this special configuration, each of the tines 222 curl within the interior of the wall, this curling greatly impeding any attempted subsequent removal of the support assembly 200 from the wall.

Figure 2D:
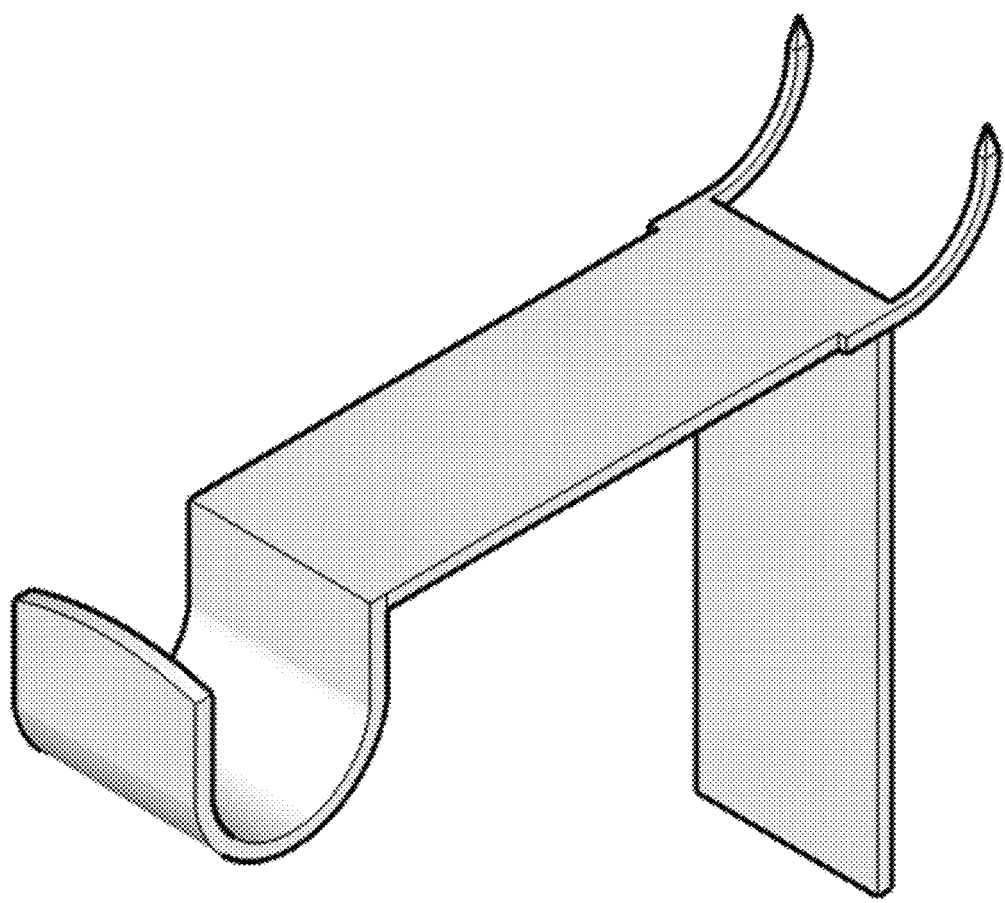
FIGS. 2D-2J illustrate the ornamental design for a curtain rod support assembly.
Figure 2E:
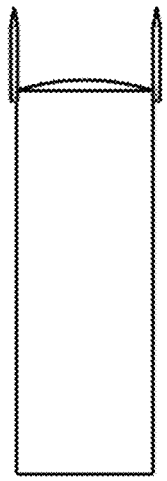
Figure 2F:
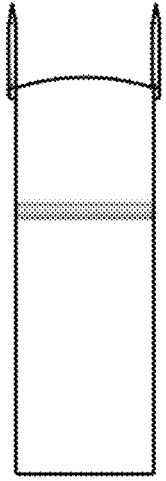
Figure 2G:
Figure 2H:
Figure 2I:
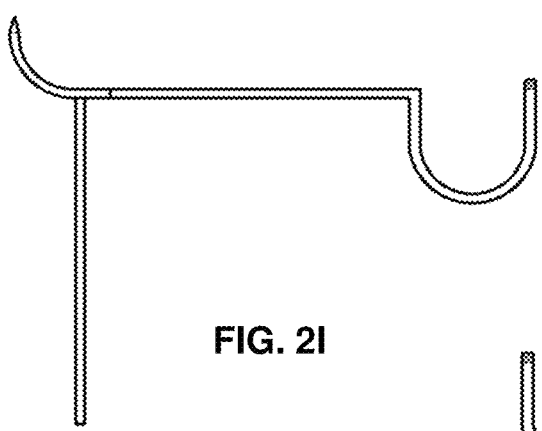
Figure 2J:
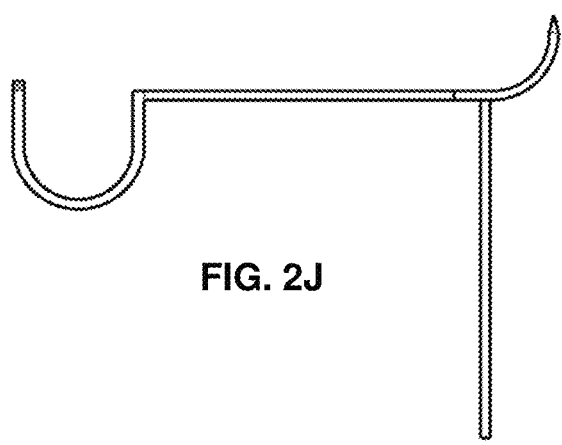

FIGS. 2D-2J illustrate the ornamental design for a curtain rod support assembly: FIG. 2D is a front elevational view of the curtain rod support assembly showing the new design, FIG. 2E is a rear view thereof, FIG. 2F is a front view thereof, FIG. 2G is a top view thereof, FIG. 2H is a bottom view thereof, FIG. 2I is a left side view thereof and FIG. 2J is a right side view thereof. It is understood that depending on the length of the tines and the thickness of the wallboard, this embodiment may be used as an anchor either through or within wallboard.

Arcuate Anchoring Portion Anchored Through Wallboard

In some example embodiments, the anchoring portion comprises one or more generally arcuate tine extending from the support portion of the support assembly and the tines are configured to extend through both surfaces of a wallboard. In these embodiments, the tines are configured to be inserted into the wall starting at a generally perpendicular angle to the wall surface and the curve of the tines causing the tines to project through the wallboard and downward or upward as they are inserted into the wallboard.

As shown in the example embodiments of FIGS. 2A-2B, the anchoring portion 220 comprise one or more tines 222 extending from the support assembly 200 at an upward curve. The curve is generally shaped to allow the pointed end of the tines 222 to be inserted into the wall, and through a pushing of the tines through a front surface of the wall and a rotation of the assembly downward, the tines continue into the wall and the pointed end of the tine 222 rests on the backside or rear surface of the wallboard above the aperture created where the tines 222 went through the wall. In this position, the support assembly 200 is secured to the wallboard by multiple features such as (1) the tines 222 being supported vertically by the small aperture in the wallboard, (2) the tines 222 being held horizontally by the angle of aperture in the wallboard and friction with the aperture walls, (3) the support portion 260 resting on the outside surface of the wall surface and (4) the pointed tip of the tine 222 resting on the backside of the wall surface. In this embodiment, the curve and the length of the tine 222 is configured to allow for the tine offset 224 reflecting the width of the wallboard.

The configuration of FIGS. 2A-2B also helps the support assembly efficiently support the forces placed on the support assembly and the wall. In particular, in the embodiment shown, the assembly provides additional elements that better support loads than if the tines alone were securing the assembly to the wall. As shown in the example embodiment of FIG. 2A, the moment caused by force F-1 (which may be the result of the assembly holding a curtain rod with the receptacle portion 240) about the Pivot is offset by the offsetting moments caused by F-A (tine 220 against the backside of the wall) and F-B (tine 220 against the aperture through the wall and against the outside of the wall surface). Because some of the applications for the support assembly will include a receptacle portion 240 that extends away from the wall surface, the support moment caused by that moment arm and the load F-1 will put a significant force and moment on the tines 220 in the aperture. And for many wall materials, such as wallboard, the wall material's ability to withstand the strain caused by that moment with narrow tines 220 will be very limited. And different than support assemblies that may only have one of the support or anchoring portions, embodiments of the support assembly with both an anchoring portion (e.g. tines 220 at F-A) and the tines 220 going through the aperture (at F-B) are able to use both of these portions to offset the moment caused by load F-1. And embodiments that have a long support portions and long anchoring portions (e.g. tines 220), the moment arms created by their longer length enhance their ability to offset the moment caused by the load F-1. This offsetting or reduction of the support moment caused by F-1 will reduce the amount of strain on the tine where it goes through the aperture in the wall. This reduction in strain allows for greater loads to be applied as F-1 or allows a reduction in the strain resistance properties needed in the wall material. Regarding shear stresses, the wall material will provide a resistance force of F-C to counter F-1. This shear resistance will be provided by a compression force of the wall material against the portion of the tine going through the wall. When the wall material is a material such as wallboard, this material is traditionally designed to provide good compression resistance.

The length of the anchoring, support and receptacle portions may be any length suitable for their purpose. In some embodiments of the support assembly, when used as a curtain rod support assembly, the length of the receptacle portion may range from about 1 inch to 12 inches, the length of the supporting portion may range from about 1 inch to 12 inches, the length of the anchoring portion may range from about 1 to 12 inches and an angle of curvature of the anchoring portion having a radius ranging from about 0.20 inches to 3 inches. In a preferred embodiment of a curtain rod support assembly, the length of the receptacle portion may range from about 2 to 5 inches, the length of the supporting portion may range from about 2 to 5 inches the length of the anchoring portion may range from about 1 to 5 inches, and the curvature of the anchoring portion having a radius ranging from about 0.25 to 1.50 inches. In one preferred embodiment of a curtain rod support assembly, the angle of curvature of the anchoring portion having a radius of about 0.50 inches. Depending the material from which the support assembly is made, the width and thickness of its portions are sized to provide sufficient rigidity and support to the support assembly.

In some embodiments, the anchoring portion may have multiple arcuate portions having multiple angles of curvature. For example, the anchoring portion may have a first arcuate portion and a second arcuate portion where the first arcuate portion has a radius of curvature in the range of about 0.25 inches to 0.75 inches and the second arcuate portion has a radius of curvature larger than the radius of curvature of the first arcuate portion. In some embodiments, the radius of curvature of the second arcuate portion comprises a range of about 0.50 inches to 12 inches.

FIG. 2C shows an example embodiment of the support assembly 200 being used to support a curtain rod 280 around a window frame 282 and the tines 222 are behind the outside wall surface.

Arcuate Anchoring Portion Anchored with Separable Tine

In some example embodiments, the anchoring portion comprises a separate element that can be coupled with other elements of the support assembly to secure the assembly to a surface. In these embodiments, the anchoring portion may have the generally shape and function of the anchoring portions described above, but as a separate element coupled to the support assembly through a coupling element like a hole, slot, channel or other means to couple the anchoring portion to the support assembly. For example, the anchoring portion may be separate tines that are coupled to the support assembly through holes in the support portion. In some embodiments, the anchoring portion may comprise curved tines, similar to "monkey hooks" configured to be inserted through the coupling means of the assembly and into the wall and securing the assembly to the wall.

Suitable embodiments of a separable tine include wire tine elements similar to those disclosed in U.S. Pat. No. 4,509,713 filed Aug. 24, 1984 and U.S. Pat. App. Pub. No. 2005/0218284 published on Oct. 6, 2005 for U.S. patent application Ser. No. 11/030,388 filed Jan. 6, 2005, both of which are herein incorporated by reference in their entirety.

Figure 3A:
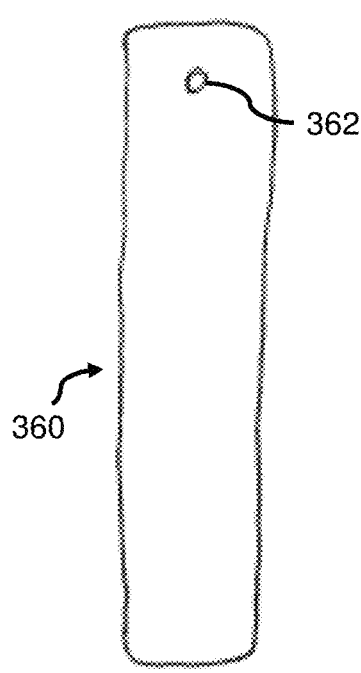
FIGS. 3A-3C show an example embodiment of a support assembly illustrating a rear view of one embodiment of the support portion in FIG. 3A, a rear view of another embodiment of the support portion in FIG. 3B and a side view of the support assembly mounted on a wall in FIG. 3C.
Figure 3B:
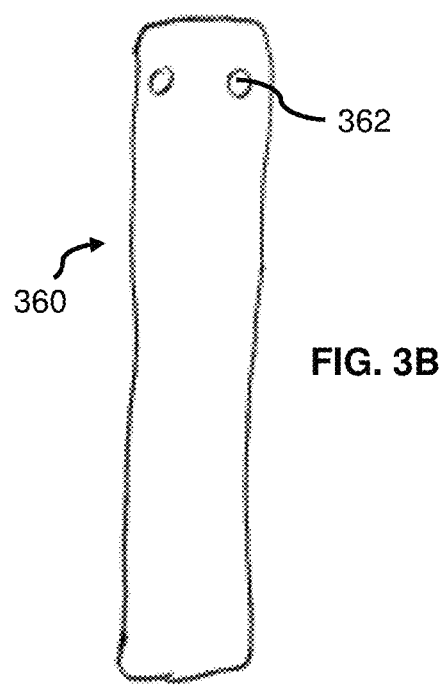
Figure 3C:
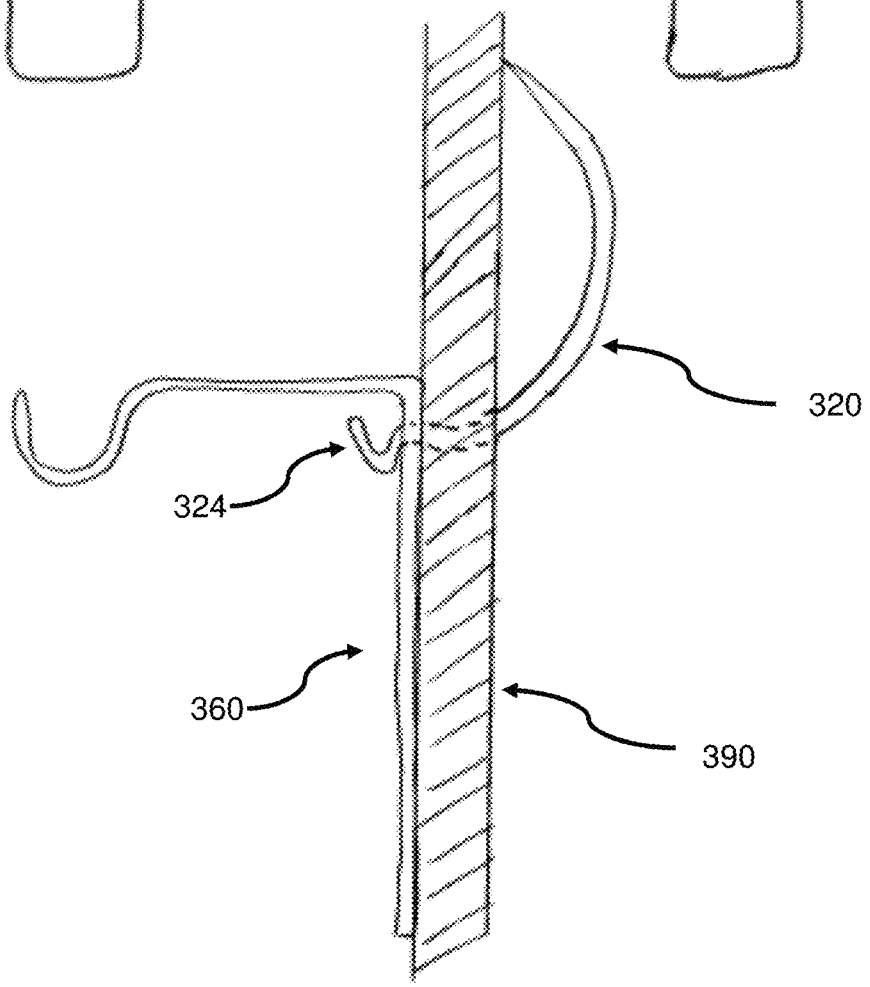

FIG. 3C shows an example embodiment where the anchoring portion 320 comprises a separate monkey hook to be inserted into holes 362 (see FIGS. 3A and 3B) in the support portion 360 of the assembly 300. The hook portion 324 helps secure the anchoring portion 320 against the support portion 360 and provides a surface that someone can pull on when trying to remove the anchoring portion 320 from the wall 390.

For the embodiment shown in FIG. 3A, the single hole 362 in the center of the support portion 360 allows the assembly 300 to essentially self-level itself on the surface of the wall 390. For the embodiment shown in FIG. 3B, the multiple holes 362 provide a more secure anchoring of the assembly 300 to the wall surface.

Anchoring Portion Generally Straight and Anchored with Separable Anchoring Portion In some example embodiments, the anchoring portion comprises a separate or separable element that may be coupled with other elements of the support assembly to secure the assembly to a surface. In these embodiments, the anchoring portion may have the general shape and function of the anchoring portions described above, but is a separate element coupled to the support assembly through a coupling element like a hole, slot, channel or other means to couple the anchoring portion to the support assembly.

As shown in the example embodiments of FIGS. 4A-4I, the support assembly 400 further includes a bracket portion 463 to couple with the anchoring portion 420. As shown in FIGS. 4A-4C, the anchoring portion 420 may be a separable element from the support portion 460 and the receptacle portion. The bracket portion 463 is configured to receive and retain the anchoring portion 420. The bracket portion 463 generally comprises a support bracket having a first leg 464, a second leg 465 and a third leg 466. The first leg 464 generally extending along a side of the support portion 460 and couples the bracket portion to the support assembly 400. The second leg 465 is coupled to the first leg 464 and generally extends at an angle from the first leg 464. The second leg 465 generally extends perpendicular from the first leg and is oriented generally parallel to the receptacle portion 440. The third leg 466 is coupled to the second leg 465 and generally extends at an angle from the second leg 465 and oriented generally at an angle to have a distal end of the third leg proximal to the first leg 464. The legs also have a first and second opening (467A and 467B) that are aligned and configured to receive and retain the anchoring portion 420. The anchoring portion 420 is separate from or separable from the bracket portion 463 and is configured to extend from the first opening 467A to the second opening 467B and into the wall whereby the anchoring portion 420 anchors the support assembly 400 in the wall.

The separability of anchoring portion from the rest of the bracket assembly may be made by any means that allows the anchoring portion to separate from the bracket assembly without a large amount of force. For example, in one embodiment, the anchoring portion, such as a nail or pin, may be inserted into the aligned openings prior to a coating or painting process and when this coating dries, the anchoring portion is attached or rigidly coupled to the openings. When suitable force is applied to the anchoring portion, such as a tap from a hammer, the coating is broken, and the anchoring portion is separated from the openings so that it can proceed to go into the wall surface.

Examples of suitable configurations of the legs of the bracket portion 463 and the anchoring portion 420 include those disclosed in U.S. Pat. No. 2,464, 295, issued Mar. 15, 1949 which is herein incorporated by reference in its entirety.

The anchoring portion 420 may be any element that can anchor the support assembly 400 into the wall. As shown, the anchoring portion 420 may comprise an element such as a nail or pin.

In some embodiments, the support portion 460, the receptacle portion 440 and the bracket portion 463 may be an integral assembly manufactured from a single plate of material. In some embodiments, the bracket portion 463 may be created from cut-away portions of the support portion 460 and/or the receptacle portion 440.

In some embodiments, to increase the opposing moments (see FIG. 2A) the bracket portion 463 may be configured to be at an increased distance from, for example above, the point where the receptacle portion 440 couples to the support portion 460.

FIGS. 4A-4I illustrate the ornamental design for a curtain rod support assembly also showing the anchoring portion: FIG. 4A is a front elevational view of the curtain rod support assembly showing the new design, FIG. 4B is a rear elevations view thereof, FIG. 4C is a side elevational view thereof, FIG. 4D is a rear view thereof, FIG. 4E is a front view thereof, FIG. 4F is a top view thereof, FIG. 4G is a bottom view thereof, FIG. 4H is a left side view thereof and FIG. 4I is a right side view thereof.

Figure 5A:
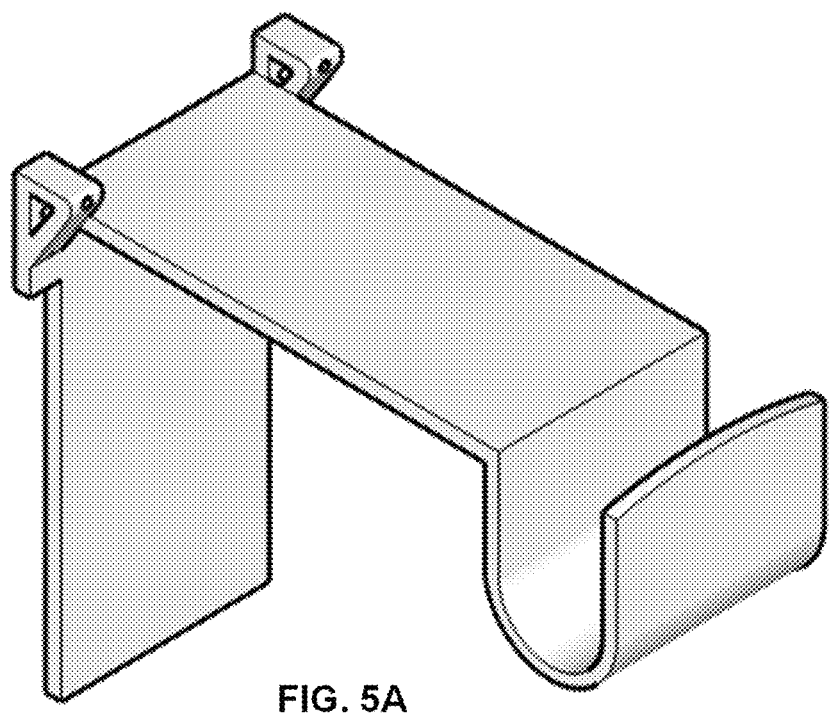
Figure 5B:
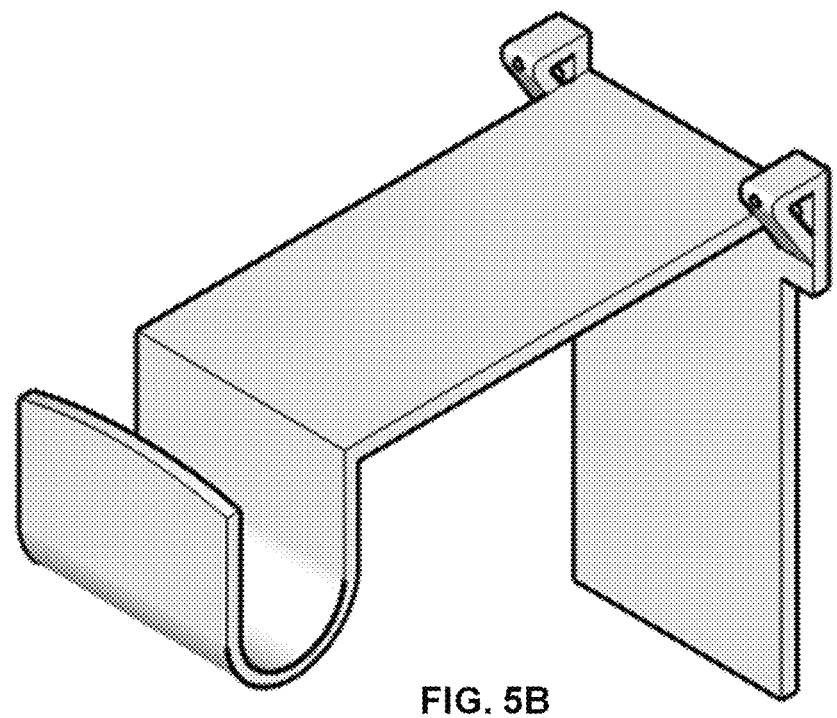

FIGS. 5A-5H illustrate the ornamental design for a curtain rod support assembly without the anchoring portion: FIG. 5A is a side elevational view of the curtain rod support assembly showing the new design, FIG. 5B is a side elevational view thereof, FIG. 5C is a rear view thereof, FIG. 5D is a front view thereof, FIG. 5E is a top view thereof, FIG.

5F is a bottom view thereof, FIG. 5G is a left side view thereof and FIG. 5H is a right side view thereof.

Example Embodiments of the Support Assembly in Operation

Operationally, the support assembly generally functions by inserting the anchoring portion into the wall surface until the support portion rests on the wall surface. With the support assembly secured to the wall, items can be hung from the assembly with the receptacle portion. For most installations, the insertion of the assembly into the wall may be done with pressure applied by a hand or thumb pushing on the assembly. In some embodiments, the assembly may be inserted into the wall with the tap of a hammer.

For installation of embodiments having straight perpendicular anchoring portions, the support assembly is positioned so that the tips of the anchoring portions can be pushed into the wall surface. The anchoring portion (e.g., tine) is pushed into the wall until the support portion abuts the wall.

For installation of embodiments having arcuate anchoring portions, the support assembly is temporarily positioned so that the pointed end of the anchoring portions (e.g., tines) can be pushed through the wall surface to start a small aperture in the wall. The anchoring portions are then further pushed into the wall and the support assembly is rotated (e.g. downward) until the support portion of the assembly is supported by the wall surface.

For installation of embodiments having a separate anchoring portion, the support assembly is held against the wall surface and the anchoring portion (e.g., monkey hook, nail or pin) is inserted into the holes of the support portion and into the wall surface until the support assembly is secured to the wall.

Once the support assembly is secured to the wall surface, articles such as pictures, window coverings and the like may be hung from the receptacle portion which is integrally formed from the support assembly. Support assemblies configured to support curtain rods and curtain rod support assemblies may have receptacle portions which are shaped to receive and retain the curtain rod.

Extraction of the support assembly is achieved by pulling the support assembly in the opposite direction that was applied to secure the assembly to the wall surface. For assemblies with arcuate anchoring portions, the support assembly may be rotated to help pull the assembly from the wall.

Although this invention has been described in the above forms with a certain degree of particularity, it is understood that the foregoing is considered as illustrative only of example embodiments and principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention which is defined in the claims and their equivalents.

I claim:

1. A support assembly for supporting an object on a wall, the support assembly comprising:
a support portion comprising a generally planar element comprising two unobstructed and uninterrupted planar surfaces extending from an upper end to a lower end and extending from aside edge of the support portion to an opposing side edge of the support portion;
the lower end of the support portion terminating the two unobstructed and uninterrupted planar surfaces at an end edge extending from one unobstructed and uninterrupted planar surface to the other unobstructed and uninterrupted planar surface;
an anchoring portion having a penetration end and support end;
a receptacle portion comprising a generally planar element having a support end and a receptacle end;
the support end of the receptacle portion rigidly coupled to and generally extending orthogonally from the upper end of the support portion;
the support end of the anchoring portion rigidly coupled to and extending from aside edge of the support end of the receptacle portion;
the anchoring portion comprising an arcuate member;
the penetration end of the arcuate member comprising a sharpened tine whereby the anchoring portion can be forced into the wall without the need to drill a hole;
the receptacle end of the receptacle portion having a u-shape whereby the receptacle portion is configured to receive and retain a curtain rod as the object; and
wherein the support assembly is a unitary assembly.

2. The support assembly of claim 1 wherein the arcuate member has a radius of curvature in a range of about 0.25 inches to 0.75 inches.

3. The support assembly of claim 1 wherein:
the arcuate member comprises a first arcuate portion and a second arcuate portion;
the first arcuate portion has a radius of curvature in a range of about 0.25 inches to 0.75 inches; and
the second arcuate portion has a radius of curvature larger than the radius of curvature of the first arcuate portion.

4. The support assembly of claim 1 wherein:
the wall has a front surface and a rear surface; and
the penetration end of the arcuate member engages the rear surface of the wall when the support assembly is installed whereby the penetration end provides an offsetting moment to a support moment caused by the curtain rod retained in the receptacle end of the receptacle portion.

5. The support assembly of claim 1 wherein:
the receptacle portion has a length ranging from about 2 to 5 inches;
the support portion having a length ranging from about 2 to 5 inches; and
the anchoring portion having a length ranging from about 1 to 5 inches.

6. The support assembly of claim 1 wherein:
wherein the support assembly is manufactured from a single plate of material;
the support end of the arcuate member is integral to the support end of the receptacle portion; and
the penetration end of the arcuate member comprises a cut-away portion of the upper end of the support portion.

7. The support assembly of claim 1 wherein the support end of the anchoring portion comprises abase portion integral to and extending from the side edge of the support end of the receptacle portion.

8. The support assembly of claim 1 wherein:
the support portion is configured to engage a front surface of the wall and provide a pivot;
a mass of a curtain rod retained in the receptacle end of the receptacle portion creates a support moment about the pivot;

the anchoring portion comprises two anchoring portions configured to engage a back surface of the wall and receive a first and a second force from the wall whereby when the support assembly is installed, the two anchoring portions provide a first and a second offsetting moment to the support moment; and the two anchoring portions are configured to engage the wall at a position above a center of gravity of the curtain rod retained in the receptacle portion whereby the at two anchoring portions receive a third and a fourth force from the wall to provide a third and a fourth offsetting moment to the support moment.

9. A support assembly for supporting an object on a wall, the support assembly comprising:

a support portion comprising a generally planar element comprising two unobstructed and uninterrupted planar surfaces extending from an upper end to a lower end and extending from aside edge of the support portion to an opposing side edge of the support portion;

the lower end of the support portion terminating the two unobstructed and uninterrupted planar surfaces at an end edge extending from one unobstructed and uninterrupted planar surface to the other unobstructed and uninterrupted planar surface;

an anchoring portion having a penetration end and support end; a receptacle portion is-comprising a generally planar element having a support end and a receptacle end;

the support end of the receptacle portion rigidly coupled to and generally extending orthogonally from the upper end of the support portion;

the support end of the anchoring portion is configured to be coupled to and extend from a side edge of the support end of the receptacle portion;

the penetration end of the anchoring portion comprising a sharpened tine whereby the anchoring portion can be forced into the wall without the need to drill a hole;

the receptacle end of the receptacle portion having a u-shape whereby the receptacle portion is configured to receive and retain a curtain rod as the object; and wherein the support assembly is a unitary structure.

10. The support assembly of claim 9 wherein:

the support assembly is manufactured from a single plate of material;

the support end of the anchoring portion is integral to the support end of the receptacle portion; and the penetration end of the anchoring portion comprising a cut-away portion of the upper end of the support portion.

11. The support assembly of claim 9 wherein the anchoring portion comprising an arcuate member.

12. The support assembly of claim 9 wherein the anchoring portion comprising a straight member.

13. The support assembly of claim 9 wherein the support end of the anchoring portion comprises abase portion integral to and extending from the side edge of the support end of the receptacle portion.

14. The support assembly of claim 9 wherein:

the support portion is configured to engage a front surface of the wall and provide a pivot;

a mass of a curtain rod retained in the receptacle end of the receptacle portion creates a support moment about the pivot;

the anchoring portion comprises two anchoring portions configured to engage a back surface of the wall and receive a first and a second force from the wall whereby when the support assembly is installed, the two anchoring portions provide a first and a second offsetting moment to the support moment; and the two anchoring portions are configured to engage the wall at a position above a center of gravity of the curtain rod retained in the receptacle portion whereby the two anchoring portions receive a third and a fourth force from the wall to provide a third and a fourth offsetting moment to the support moment.

* * * * *